(12) United States Patent
Miyamoto (10) Patent No.: US 8,190,106 B2
(45) Date of Patent: May 29, 2012

(54) BASE STATION CONTROL APPARATUS AND BASE STATION CONTROL METHOD

(75) Inventor: Hiroaki Miyamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 502 days.

(21) Appl. No.: 12/443,729

(22) PCT Filed: Jun. 4, 2008

(86) PCT No.: PCT/JP2008/060316
§ 371 (c)(1),
(2), (4) Date: Mar. 31, 2009

(87) PCT Pub. No.: WO2008/155991
PCT Pub. Date: Dec. 24, 2008

(65) Prior Publication Data
US 2009/0305740 A1    Dec. 10, 2009

(30) Foreign Application Priority Data

Jun. 20, 2007    (JP) ................................ 2007-162749

(51) Int. Cl.
| H04B 1/04 | (2006.01) |
| H04B 1/00 | (2006.01) |
| H04B 15/00 | (2006.01) |
| H04B 17/00 | (2006.01) |
| H03C 1/62 | (2006.01) |
| H04W 4/00 | (2009.01) |
| H04W 36/00 | (2009.01) |

(52) U.S. Cl. ................. 455/114.2; 455/63.1; 455/67.11; 455/115.1; 455/115.3; 455/422.1; 455/436; 455/438; 455/443; 370/332

(58) Field of Classification Search ............... 370/310.2, 370/328, 332; 455/63.1, 67.11, 114.2, 115.1, 455/115.3, 418, 422.1, 436, 438, 443, 445, 455/456.5

See application file for complete search history.

(56) References Cited

U.S. PATENT DOCUMENTS

2001/0007552 A1 *    7/2001    Schiff et al. .................. 370/331

(Continued)

FOREIGN PATENT DOCUMENTS

EP    1608120 A    12/2005

(Continued)

OTHER PUBLICATIONS

International Search Report for PCT/JP2008/060316 mailed Sep. 16, 2008.

*Primary Examiner* — Dwayne Bost
*Assistant Examiner* — Larry Sternbane (57) ABSTRACT

There is provided a base station control apparatus and a base station control method in which a frame is segmented in a situation in which interference may occur. A BS controller divides and controls a base station into three sectors and controls communications with terminal stations (TSs). A control unit determines whether or not the TS is in at least any of a state in which the TS is interfered within a certain sector by any other sector and a state in which the TS is located in a boundary between a plurality of sectors, and segments a communication frame for a TS which is determined as being in at least any of a state in which the TS is interfered within a certain sector by any other sector and a state in which the TS is located in a boundary between a plurality of sectors.

10 Claims, 8 Drawing Sheets

U.S. PATENT DOCUMENTS

| | | | |
|---|---|---|---|
| 2005/0047259 A1* | 3/2005 | Ahn et al. ................ 365/232 |
| 2005/0124344 A1* | 6/2005 | Laroia et al. ............. 455/436 |
| 2007/0081491 A1* | 4/2007 | Kim et al. ................ 370/329 |
| 2007/0173198 A1* | 7/2007 | Kim et al. ................ 455/63.1 |

FOREIGN PATENT DOCUMENTS

| | | |
|---|---|---|
| JP | 2004529527 A | 9/2004 |
| JP | 2005080286 A | 3/2005 |
| JP | 2007513569 A | 5/2007 |

* cited by examiner

BASE STATION CONTROL APPARATUS AND BASE STATION CONTROL METHOD

TECHNICAL FIELD

The present invention relates to a wireless communication system, and more particularly, to a base station control apparatus and a base station control method in which interference in a sector edge is suppressed, and communication efficiency is improved.

BACKGROUND ART

As a demand for a high-speed wireless service is gradually increased, an improvement on a practical transfer rate per band is required to handle more subscribers according to an increment of a data transfer rate while guaranteeing a Quality of Service (QoS).

Recently, an Orthogonal Frequency Division Multiplex Access (OFDMA) wireless network which is based on Orthogonal Frequency Division Multiplex (OFDM) attracts public attention. As an advantage of an OFDMA modem, electric power and speed are optimally allocated between narrow-band subcarriers, and a guide band is not needed when a channel is divided within OFDMA, whereby frequency use efficiency is improved.

There is a technique for preventing interference by dividing a communication band into three sub channels when dividing into three sectors using one frequency utilizing the above features. That is, there is a technique for dividing one frequency into three segments.

Figure 1:
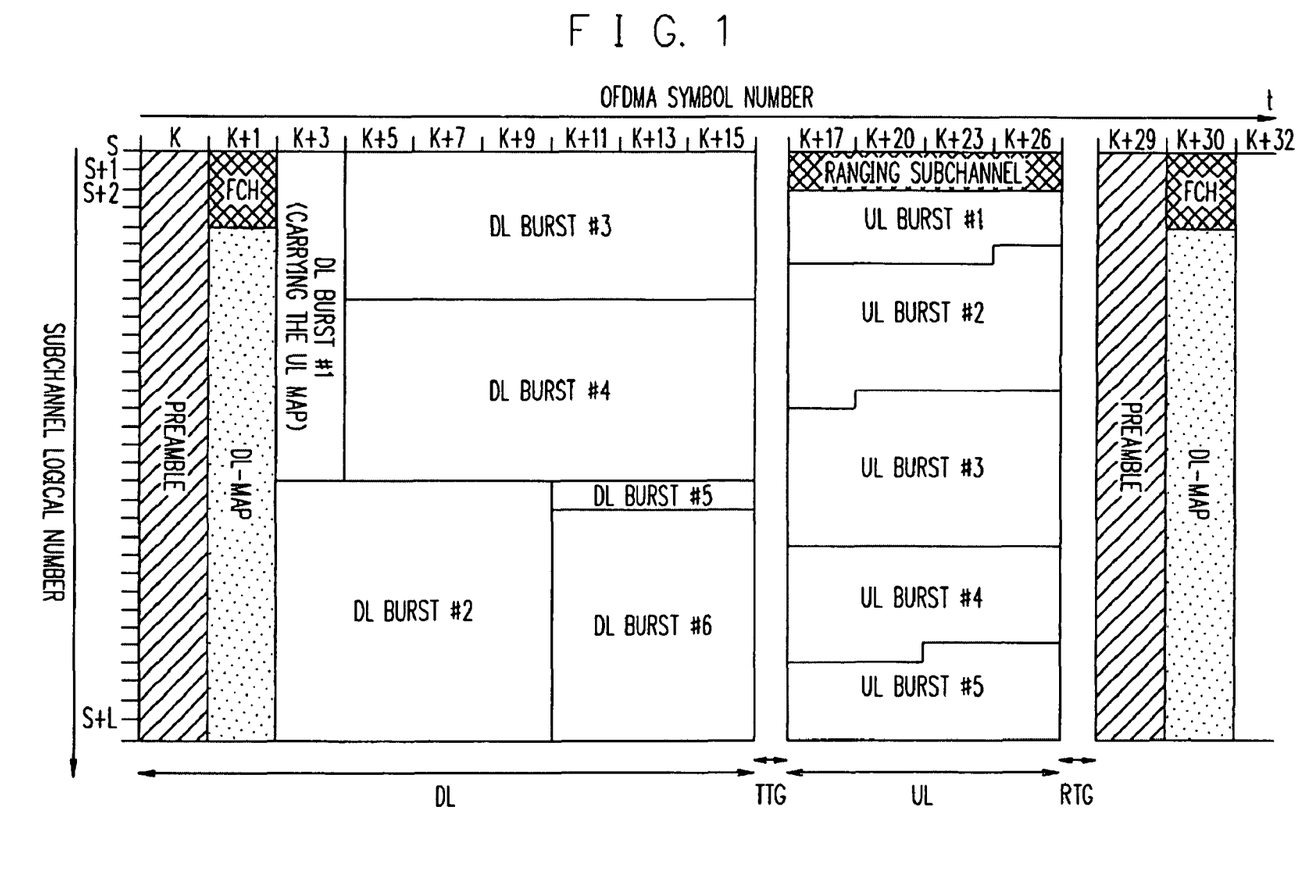
FIG. 1 illustrates an example of a configuration of a frame which is not divided into segments.
Figure 2:
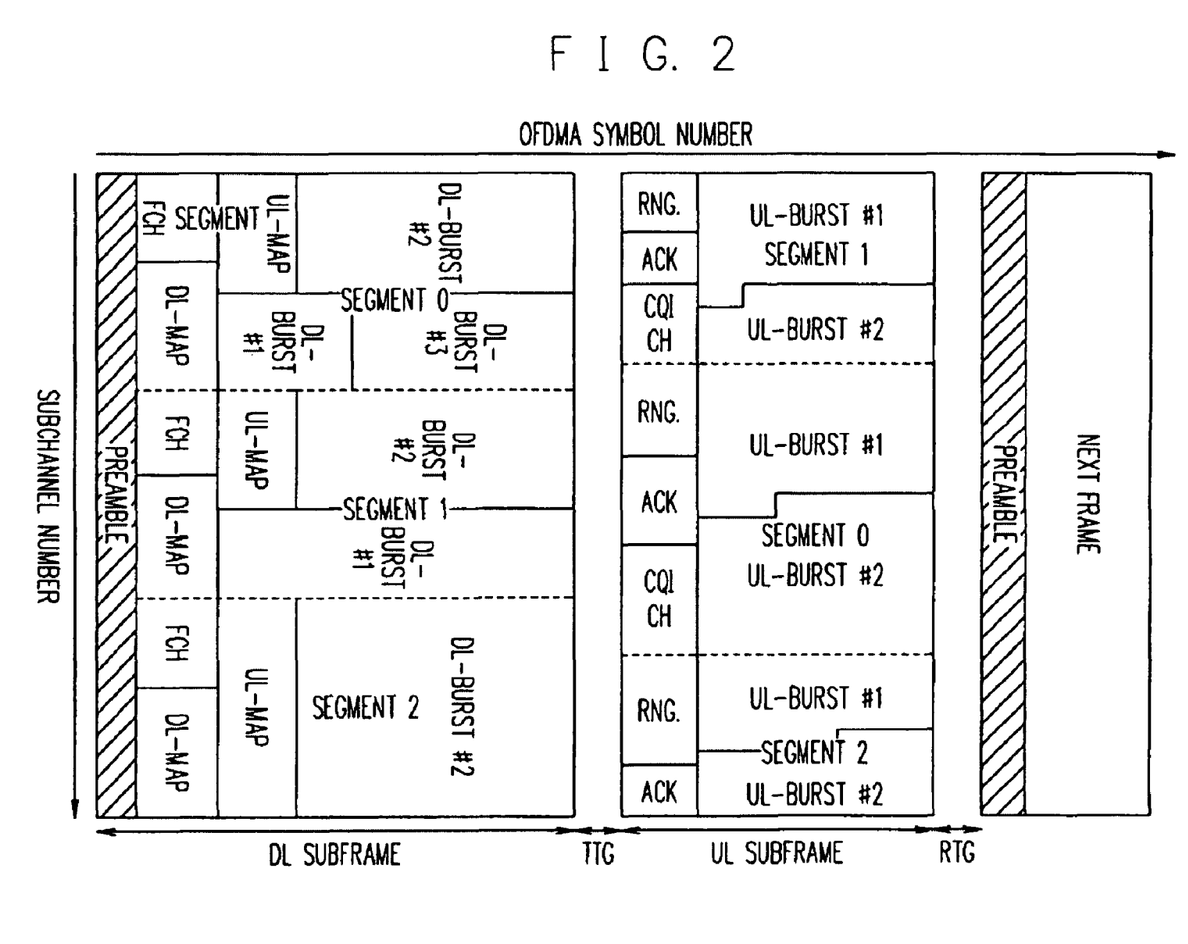
FIG. 2 illustrates an example of a configuration of a frame which is divided into segments.

FIG. 1 illustrates a configuration of an OFDMA frame which is not divided into segments according to IEEE 802.16e. FIG. 2 illustrates a configuration of an OFDMA frame which is divided into three segments.

In a configuration of a frame, when not dividing into segments, user data can be allocated to all sub channels, but when segmenting, the number of sub channels allocated to each segment is reduced to a third (⅓).

Segmentation is necessary in an area in which interference occurs between radio signals from a plurality of sectors, that is, "sector interference area". However, segmentation is not necessary in the other places since there occurs no or little interference. Therefore, if segmentation is performed at each time, communication band use efficiency deteriorates.

As a technical document related to OFDMA, "MULTI-CARRIER COMMUNICATION WITH TIME DIVISION MULTIPLEXING AND CARRIER-SELECTIVE LOADING" is disclosed in Patent Document 1.

Patent Document 1: Japanese Patent Application National Publication (Laid-Open) No. 2004-529527

DISCLOSURE OF THE INVENTION

Problem to Be Solved by the Invention

Although, in the invention disclosed in Patent Document 1, each subscriber measures a signal to interference plus noise ratio (SINR) for each subcarrier cluster, it is not determined whether or not a subscriber is located in an interference area (cell boundary). For this reason, when a SINR is not lowered even though a subscriber is located in a cell boundary, a frame is not segmented in spite of a situation in which interference can occur.

That is, in the invention disclosed in Patent Document 1, segmentation is not performed even in a situation in which interference can occur, whereby communication quality can deteriorate.

The present invention is devised to resolve the above problems, and it is an object of the present invention to provide a base station control apparatus and a base station control method in which a frame is segmented in a situation in which interference can occur.

Means to Solve the Problem

In order to achieve the above-described object, according to a first aspect of the present invention, there is provided a base station control apparatus that divides and controls a base station into at least two sectors and controls communications with a plurality of terminal stations, including, a unit that determines whether or not a certain terminal station is in at least any of a state in which the terminal station is interfered within a certain sector by any other sector and a state in which the terminal station is located in a boundary between a plurality of sectors, and a unit that segments a communication frame within a sector when there exists a terminal station that is determined as being in at least any of a state in which the terminal station is interfered within a certain sector by any other sector and a state in which the terminal station is located in a boundary between a plurality of sectors.

In order to achieve the above-described object, according to a second aspect of the present invention, there is also provided a base station control method that divides and controls a base station into at least two sectors and controls communications with a plurality of terminal stations, including, determining, at the base station, whether or not a certain terminal station is in at least any of a state in which the terminal station is interfered within a certain sector by any other sector and a state in which the terminal station is located in a boundary between a plurality of sectors, and segmenting, at the base station, a communication frame for a terminal station that is determined as being in at least any of a state in which the terminal station is interfered within a certain sector by any other sector and a state in which the terminal station is located in a boundary between a plurality of sectors.

Effect of the Invention

According to the present invention, there can be provided a base station control apparatus and a base station control method in which a frame is segmented in a situation in which interference can occur.

BEST MODE FOR CARRYING OUT THE INVENTION

Figure 3:
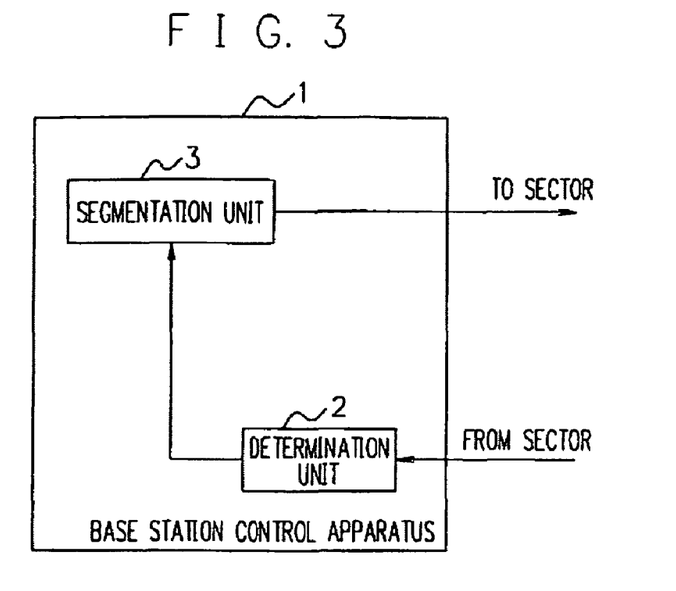
FIG. 3 illustrates an example of a configuration of a base station control apparatus according to the present invention.

As illustrated in FIG. 3, a base station control apparatus 1 according to the present invention is a base station control apparatus which divides and controls a base station into at least two sectors, and controls communications with a plurality of terminal stations. The base station control apparatus 1 includes a determination unit 2 which determines whether or not a certain terminal station is in at least any of a state in which the terminal station is interfered within a certain sector by any other sector and a state in which the terminal station is located in a boundary between a plurality of sectors, and a segmentation unit 3 which segments a communication frame within a sector when there exists a terminal station which is determined as being in at least any of a state in which the terminal station is interfered within a certain sector by any other sector and a state in which the terminal station is located in a boundary between a plurality of sectors.

Figure 4:
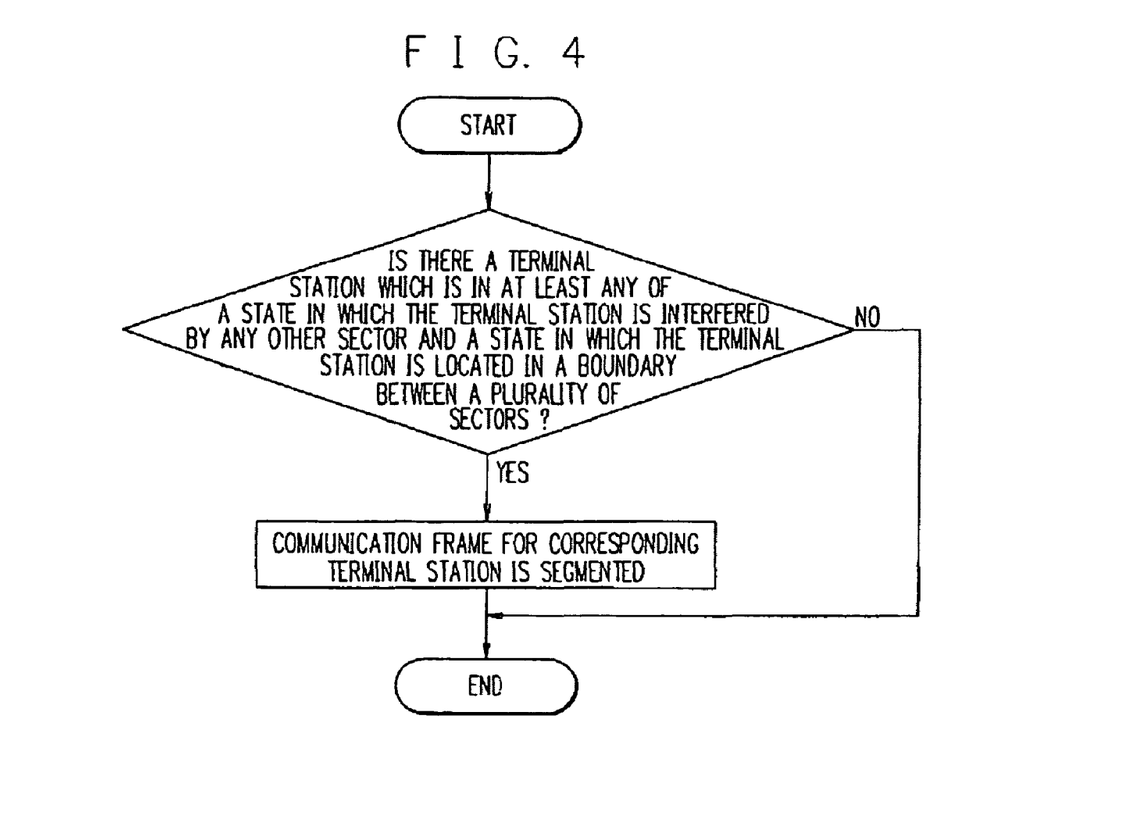
FIG. 4 illustrates an example of an operation of a base station control method according to the present invention.

As illustrated in FIG. 4, a base station control method according to the present invention is a base station control method for dividing and controlling a base station into at least two sectors, and controlling communications with a plurality of terminal stations. The base station control method includes, at a base station, determining whether or not a certain terminal station is in at least any of a state in which the terminal station is interfered within a certain sector by any other sector and a state in which the terminal station is located in a boundary between a plurality of sectors, and at the base station, segmenting a communication frame for a terminal station which is determined as being in at least any of a state in which the terminal station is interfered within a certain sector by any other sector and a state in which the terminal station is located in a boundary between a plurality of sectors.

By the apparatus and method described above, it is determined whether or not a terminal station is located in an interference area (sector interference area) between sectors or whether or not a terminal station is interfered within a sector by any other sector, and it can be determined based on the determination result whether to perform segmentation or not. Therefore, when a terminal station is not in an interference area between sectors or when a terminal station is not interfered with by any other sector, segmentation is not performed, whereby communication efficiency is improved compared to a case where segmentation is performed at each time.

Hereinafter, a preferred exemplary embodiment of the present invention will be described.

A preferred exemplary embodiment of the present invention will be described.

Figure 5:
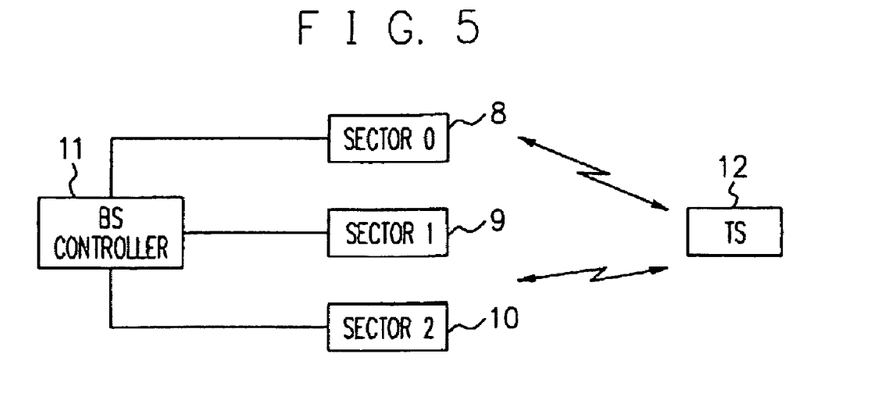
FIG. 5 illustrates a configuration of a communication system according to a preferred embodiment of the present invention.

FIG. 5 illustrates a configuration of a communication system according to the present embodiment. An IEEE 802.16e Worldwide Interoperability for Microwave Access (WiMAX) system may employ a three-sector base station configuration when developing a service area by using repetitively one frequency. The below description will be given using an example of a three-sector base station configuration.

A system includes a sector 0(8), a sector 1(9), a sector 2(10), and a BS controller (base station control apparatus) 11 which controls each sector. A plurality of terminal stations (MSs) commonly exist, but for simplification of description, one TS 12 is illustrated in the drawing.

Figure 6:
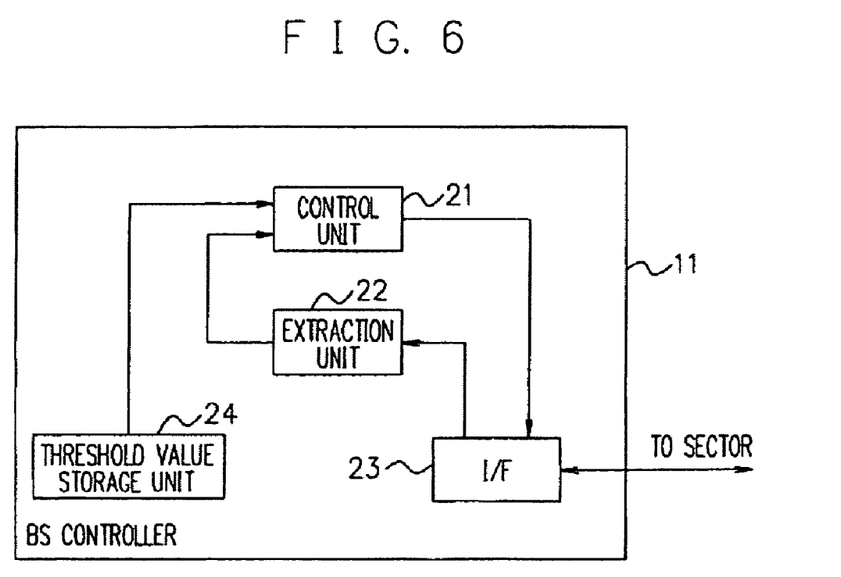
FIG. 6 illustrates a configuration of a BS controller of a communication system according to a preferred embodiment of the present invention.

FIG. 6 illustrates a configuration of the BS controller 11. The BS controller 11 includes a control unit 21, an extraction unit 22, an interface (I/F) 23, and a threshold value storage unit 24. Here, the control unit 21, the extraction unit 22 and the threshold value storage unit 24 correspond to the determination unit 2 of FIG. 3. The control unit 21 also corresponds to the segmentation unit 3 of FIG. 3.

The control unit 21 controls the whole operation of the BS controller 11. The extraction unit 22 extracts Received Signal Strength Indicator (RSSI) information and Carrier to Interference plus Noise Ratio (CINR) information included in a MOM_SCN-REP frame received from each sector. The I/F 23 performs communications with each sector. The threshold value storage unit 24 stores a threshold value, which will be described later, used when the control unit 21 determines whether to perform segmentation or not.

An operation of the communication system according to the embodiment will be described.

The sectors 8 to 10 transmit a MOB_SCN-RSP frame to the TS 12 to request a Received Signal Strength Indicator (RSSI) value and a Carrier to Interference plus Noise Ratio (CINR) value. The MS 12 transmits a MOB_SCN-REP frame including RSSI information and CINR information to the sectors 8 to 10. The BS controller 11 determines which area the TS 12 is located in based on RSSI information and CINR information acquired from the TS 12.

Figure 7:
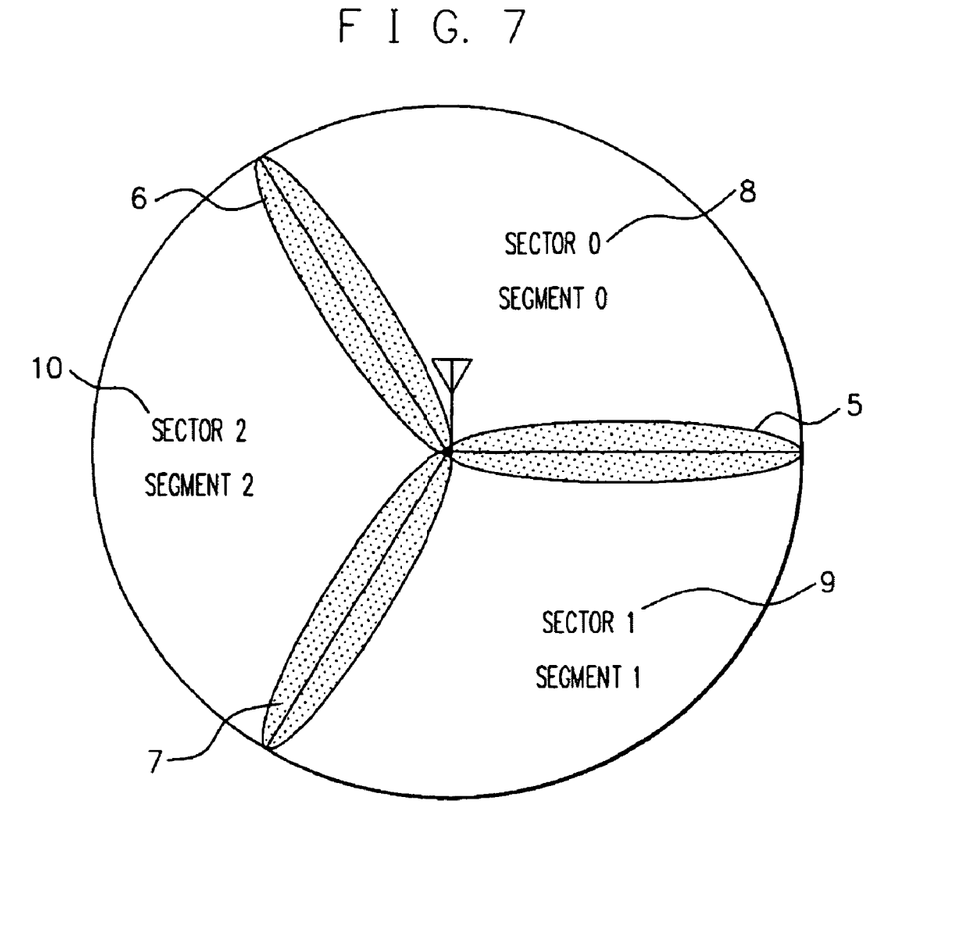
FIG. 7 illustrates an example of a relationship between sectors and interference areas.

When the BS controller 11 determines that the TS 12 is located in any of interference areas 5 to 7, the BS controller 11 divides a frame of a sector which causes interference into segments. A frame of a sector which does not cause interference is not divided into segments.

For example, in case of FIG. 7, when the TS 12 is located in an interference area 5, the BS controller divides frames of the sector 0(8) and the sector 1(9) into segments but does not divide a frame of the sector 2(10) into segments.

Figure 8:
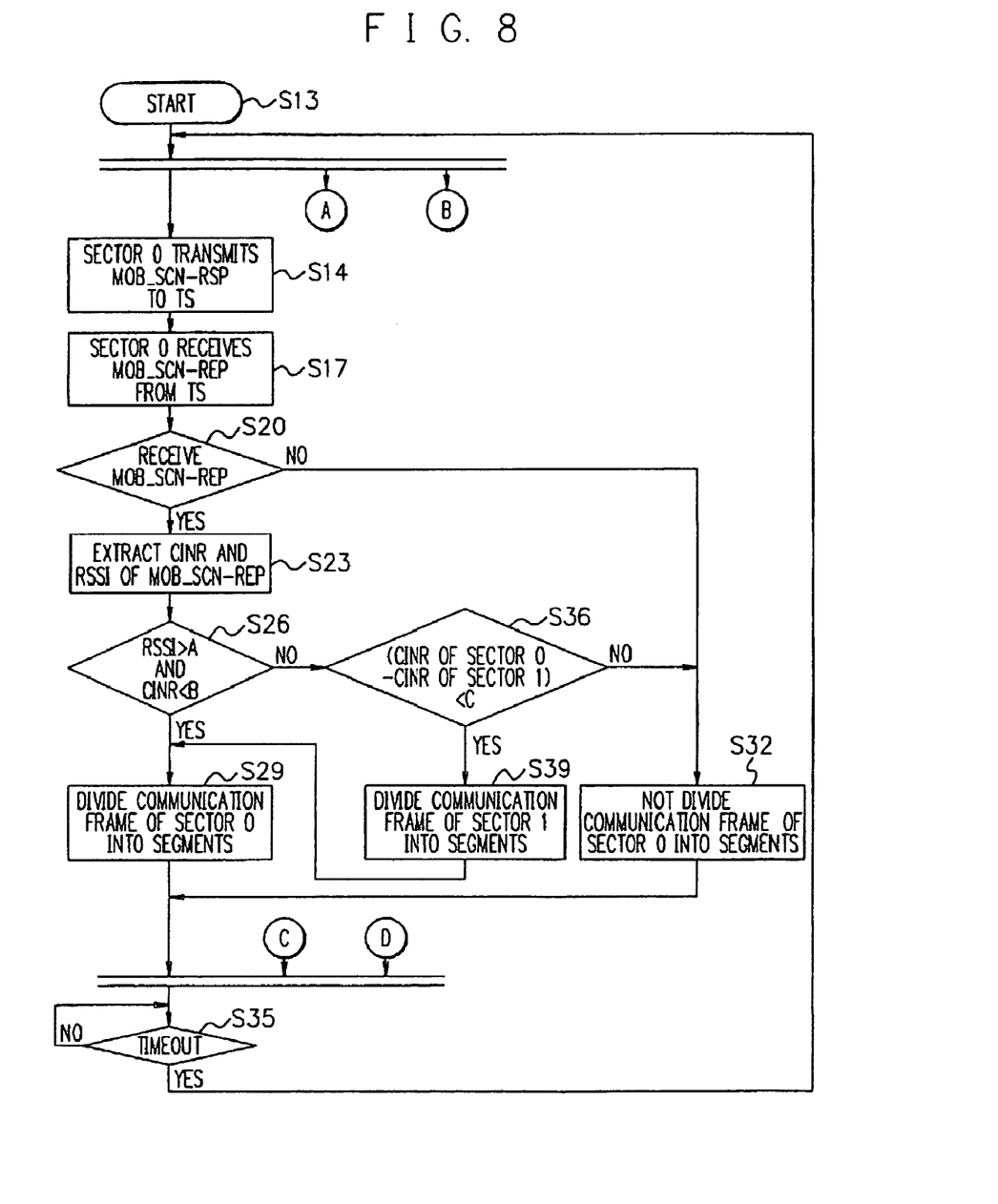
FIG. 8 is a flowchart illustrating an operation of a communication system according to a preferred embodiment of the present invention.
Figure 9:
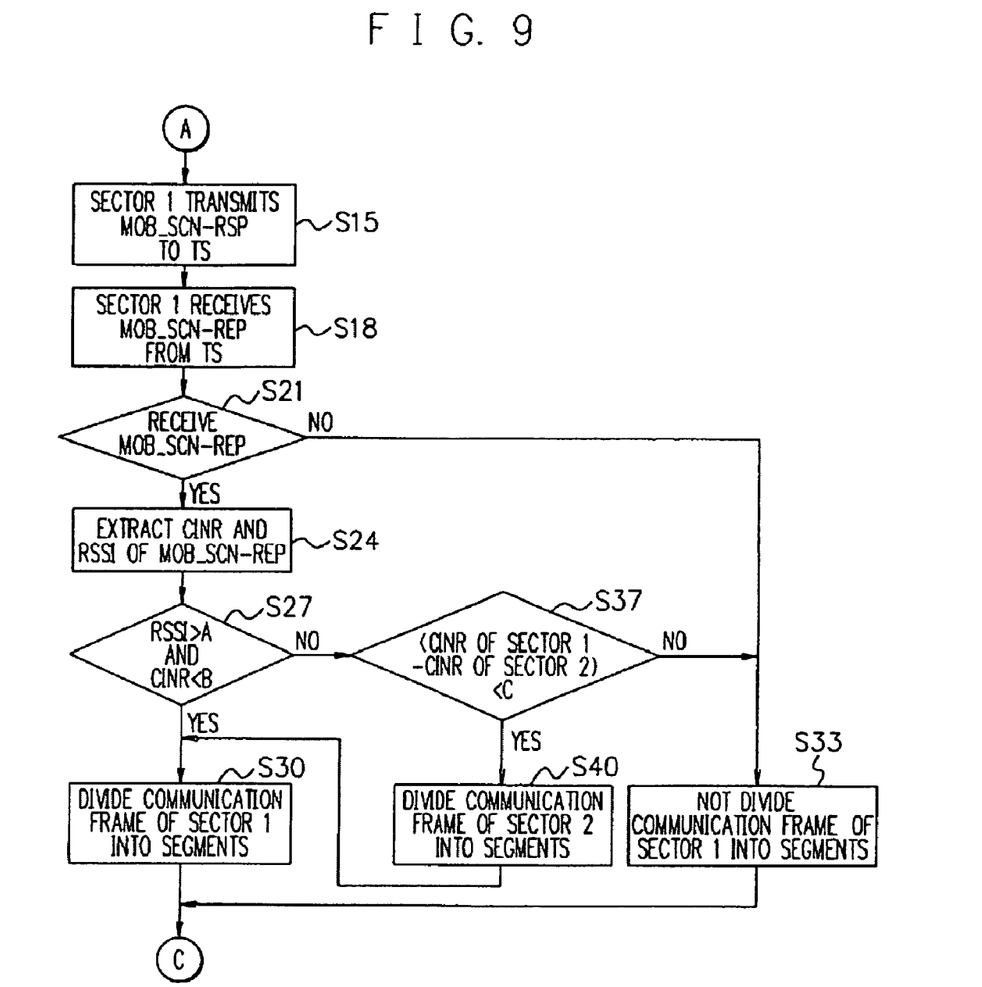
FIG. 9 is a flowchart illustrating an operation of a communication system according to a preferred embodiment of the present invention.
Figure 10:
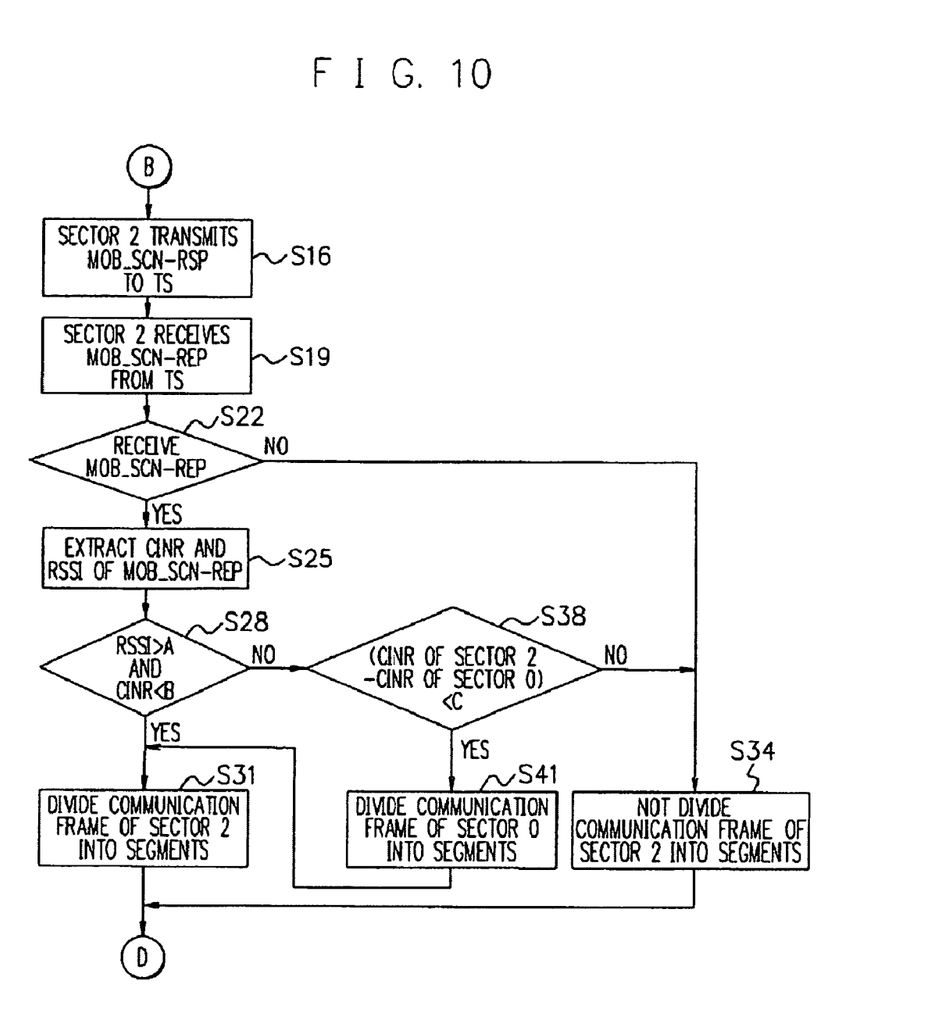
FIG. 10 is a flowchart illustrating an operation of a communication system according to a preferred embodiment of the present invention.

FIGS. 8 to 10 are flowcharts illustrating a scheduling operation. When a start is triggered by a predetermined period lapses or an instruction from the control unit 21 of the BS controller 11 (step S13), the sector 0(8) transmits a MOB_SCN-RSP frame to the TS 12 to acquire a signal receiving state (RSSI information and CINR information) of the TS 12 (step S14). The sector 1(9) also transmits a MOB_SCN-RSP frame to the TS 12 (step S15). The sector 2(10) also transmits a MOB_SCN-RSP frame to the TS 12 (step S16). The sector 0(8) receives a MOB_SCN-REP frame transmitted from the TS 12 (step S17). The MOB_SCN-REP frame includes RSSI information and CINR information when a signal is received from the sector 0(8). Once the sector 0(8) receives the MOB_SCN-REP frame, the sector 0(8) transmits the frame to the BS controller 11. The control unit 21 of the BS controller 11 determines whether or not the sector 0(8) receives the MOB_SCN-REP frame within a predetermined time (step S20). If it is determined that the sector 0(8) does not receive the MOB_SCN-REP frame within the predetermined time (step S20/No), the control unit 21 determines that the TS 12 is not located within the coverage of the sector 0(8) and the sector 0(8) does not cause interference, and thus does not divide a communication frame into segments. However, if it is determined that the sector 0(8) receives the MOB_SCN-REP frame within the predetermined frame (step S20/Yes), the extraction unit 22 extracts a RSSI value and a CINR value included in the MOB_SCN-REP frame acquired from the sector 0(8) (step S23).

Then, the control unit 21 compares the extracted RSSI value and the extracted CINR value with predetermined threshold values stored in the threshold storage unit 24, respectively, (step S26). If the RSSI value is higher than a threshold value A and the CINR value is lower than a threshold value B, it means that CINR is bad even though receiving power is high, and thus the control unit 21 determines that interference is caused by any other sector (step S26/Yes). If it is determined that interference occurs, the control unit 21 divides a communication frame of the sector 0(8) into segments in order to remove interference (step S29).

Also, the control unit 21 obtains a difference between the CINR value of the sector 0(8) and the CINR value of the sector 1(9) (step S36). If the difference is smaller than a predetermined threshold value C stored in the threshold value storage unit 24, the control unit 21 determines that the MS 12 is located in the interference area 5 and divides communication frames of the sector 0(8) and the sector 1(9) into segments (steps S39 and S29). However, if the difference between the CINR value of the sector 0(8) and the CINR value of the sector 1(9) is larger than the threshold value C, the control unit 21 does not divide a communication frame of the sector 0(8) into segments (step S32).

The above description has been given mainly on an operation related to the sector 0(8), but similar processing is performed with respect to the sector 1(9) and the sector 2(10).

As described above, in the communication system according to the present embodiment, the BS controller allocates a frequency not to cause frequency interference by dividing into a plurality of cells in order to develop a service area of a wireless communication. For example, a base station is divided into three sectors using an OFDMA technique as described above.

In this case, a frame structure of a physical layer is divided into three segments so that interference does not occur between three sectors. If three segments are equally allocated, a transmission band is lowered to a third (⅓). Such segmentation effect is a function which is necessary for a terminal station which is located in an interference area with an adjacent sector, but if a terminal station is not located in an interference area between sectors, segmentation is not needed. If a communication frame is divided into three segments, since a transmission band is lowered to about a third (⅓), communication efficiency deteriorates. For this reason, the base station side determines whether or not a terminal station is located in an interference area between sectors and determines whether to perform segmentation or not. Since segmentation is not performed when a terminal station is not located in an interference area between sectors, communication efficiency is improved compared to a case where segmentation is performed at each time.

Also, the embodiment described above is one preferred embodiment of the present invention, and the present invention is not limited to it.

For example, the above embodiment has been described using the example of the three-sector base station configuration, but the number of sectors is not limited to it.

Thus, various modifications can be made to the present invention.

This application is the National Phase of PCT/JP2008/060316, filed Jun. 4, 2008, which is based upon and claims the benefit of priority from Japanese patent application No. 2007-162749, filed on Jun. 20, 2007, the disclosure of which is incorporated herein in its entirety by reference.

DESCRIPTION OF REFERENCE NUMERALS

1: Base station control apparatus
2: Determination unit
3: Segmentation unit
5, 6, 7: Interference area
8: Sector 0
9: Sector 1
10: Sector 2
11: BS controller
12: TS
21: Control unit
22: Extraction unit
23: I/F
24: Threshold value storage unit

We claim:

1. A base station control apparatus that divides and controls a base station into at least two sectors and controls communications with a plurality of terminal stations, comprising:
a unit that determines whether or not a certain terminal station is in at least any of a state in which the terminal station is interfered within a certain sector by any other sector and a state in which the terminal station is located in a boundary between a plurality of sectors; and
a unit that segments a communication frame within a sector when there exists a terminal station that is determined as being in at least any of a state in which the terminal station is interfered within a certain sector by any other sector and a state in which the terminal station is located in a boundary between a plurality of sectors,
wherein when the terminal station is not in an interference area between the sectors, or when the terminal station is not interfered with by any other sector, segmentation is not performed.

2. The base station control apparatus of claim 1, further comprising:
a unit that makes each sector request the terminal station to transmit communication quality information that indicates a communication quality; and
a unit that determines, based on the communication quality information that the sector acquires from the terminal station, whether or not a terminal station that transmits the communication quality information is in at least any of a state in which the terminal station is interfered within a certain sector by any other sector and a state in which the terminal station is located in a boundary between a plurality of sectors.

3. The base station control apparatus of claim 2, wherein the communication quality information includes a Received Signal Strength Indicator (RSSI) value and a Carrier to Interference plus Noise Ratio CINR) value when the terminal station receives the request from the sector.

4. A base station control apparatus that divides and controls a base station into at least two sectors and controls communications with a plurality of terminal stations, comprising:
a unit that determines whether or not a certain terminal station is in at least any of a state in which the terminal station is interfered within a certain sector by any other sector and a state in which the terminal station is located in a boundary between a plurality of sectors;
a unit that segments a communication frame within a sector when there exists a terminal station that is determined as being in at least any of a state in which the terminal station is interfered within a certain sector by any other sector and a state in which the terminal station is located in a boundary between a plurality of sectors;

a unit that makes each sector request the terminal station to transmit communication quality information that indicates a communication quality; and a unit that determines, based on the communication quality information that the sector acquires from the terminal station, whether or not a terminal station that transmits the communication quality information is in at least any of a state in which the terminal station is interfered within a certain sector by any other sector and a state in which the terminal station is located in a boundary between a plurality of sectors, wherein the communication quality information includes a Received Signal Strength Indicator (RSSI) value and a Carrier to Interference plus Noise Ratio (CINR) value when the terminal station receives the request from the sector, and wherein if the RSSI value is larger than a predetermined threshold value A and the CINR value is smaller than a predetermined threshold value B, the terminal station that transmits the communication quality information is determined as being in a state in which the terminal station is interfered within a certain sector by any other sector.

5. A base station control apparatus that divides and controls a base station into at least two sectors and controls communications with a plurality of terminal stations, comprising:

a unit that determines whether or not a certain terminal station is in at least any of a state in which the terminal station is interfered within a certain sector by any other sector and a state in which the terminal station is located in a boundary between a plurality of sectors;

a unit that segments a communication frame within a sector when there exists a terminal station that is determined as being in at least any of a state in which the terminal station is interfered within a certain sector by any other sector and a state in which the terminal station is located in a boundary between a plurality of sectors;

a unit that makes each sector request the terminal station to transmit communication quality information that indicates a communication quality; and a unit that determines, based on the communication quality information that the sector acquires from the terminal station, whether or not a terminal station that transmits the communication quality information is in at least any of a state in which the terminal station is interfered within a certain sector by any other sector and a state in which the terminal station is located in a boundary between a plurality of sectors, wherein the communication quality information includes a Received Signal Strength Indicator (RSSI) value and a Carrier to Interference plus Noise Ratio (CINR) value when the terminal station receives the request from the sector, and wherein when one terminal station transmits the communication quality information to each of two sectors according to the requests from the two sectors, if a difference between CINR values of the communication quality information received by the two sectors is smaller than a predetermined threshold value C, the terminal station that transmits the communication quality information is determined as being in a state in which the terminal station is located in a boundary between the two sectors.

6. A base station control method that divides and controls a base station into at least two sectors and controls communications with a plurality of terminal stations, comprising:

determining, at the base station, whether or not a certain terminal station is in at least any of a state in which the terminal station is interfered within a certain sector by any other sector and a state in which the terminal station is located in a boundary between a plurality of sectors; and segmenting, at the base station, a communication frame for a terminal station that is determined as being in at least any of a state in which the terminal station is interfered within a certain sector by any other sector and a state in which the terminal station is located in a boundary between a plurality of sectors, wherein when the terminal station is not in an interference area between the sectors, or when the terminal station is not interfered with by any other sector, segmentation is not performed.

7. The base station control method of claim 6, wherein the base station makes each sector to request the terminal station to transmit communication quality information that indicates a communication quality, and determines, based on the communication quality information that the sector acquires from the terminal station, whether or not a terminal station that transmits the communication quality information is in at least any of a state in which the terminal station is interfered within a certain sector by any other sector and a state in which the terminal station is located in a boundary between a plurality of sectors.

8. The base station control method of claim 7, wherein the communication quality information includes a Received Signal Strength Indicator (RSSI) value and a Carrier to Interference plus Noise Ratio (CINR) value when the terminal station receives the request from the sector.

9. A base station control method that divides and controls a base station into at least two sectors and controls communications with a plurality of terminal stations, comprising:

determining, at the base station, whether or not a certain terminal station is in at least any of a state in which the terminal station is interfered within a certain sector by any other sector and a state in which the terminal station is located in a boundary between a plurality of sectors; and segmenting, at the base station, a communication frame for a terminal station that is determined as being in at least any of a state in which the terminal station is interfered within a certain sector by any other sector and a state in which the terminal station is located in a boundary between a plurality of sectors, wherein the base station makes each sector to request the terminal station to transmit communication quality information that indicates a communication quality, and determines, based on the communication quality information that the sector acquires from the terminal station, whether or not a terminal station that transmits the communication quality information is in at least any of a state in which the terminal station is interfered within a certain sector by any other sector and a state in which the terminal station is located in a boundary between a plurality of sectors, wherein the communication quality information includes a Received Signal Strength Indicator (RSSI) value and a Carrier to Interference plus Noise Ratio (CINR) value when the terminal station receives the request from the sector, and wherein if the RSSI value is larger than a predetermined threshold value A and the CINR value is smaller than a predetermined threshold value B, the base station determines that the terminal station that transmits the communication quality information is in a state in which the terminal station is interfered within a certain sector by any other sector.

10. A base station control method that divides and controls a base station into at least two sectors and controls communications with a plurality of terminal stations, comprising:

determining, at the base station, whether or not a certain terminal station is in at least any of a state in which the terminal station is interfered within a certain sector by any other sector and a state in which the terminal station is located in a boundary between a plurality of sectors; and segmenting, at the base station, a communication frame for a terminal station that is determined as being in at least any of a state in which the terminal station is interfered within a certain sector by any other sector and a state in which the terminal station is located in a boundary between a plurality of sectors, wherein the base station makes each sector to request the terminal station to transmit communication quality information that indicates a communication quality, and determines, based on the communication quality information that the sector acquires from the terminal station, whether or not a terminal station that transmits the communication quality information is in at least any of a state in which the terminal station is interfered within a certain sector by any other sector and a state in which the terminal station is located in a boundary between a plurality of sectors, wherein the communication quality information includes a Received Signal Strength Indicator (RSSI) value and a Carrier to Interference plus Noise Ratio (CINR) value when the terminal station receives the request from the sector, and wherein when one terminal station transmits the communication quality information to each of two sectors according to the requests from the two sectors, if a difference between CINR values of the communication quality information received by the two sectors is smaller than a predetermined threshold value C, the base station determines that the terminal station that transmits the communication quality information is in a state in which the terminal station is located in a boundary between the two sectors.

* * * * *